Dec. 9, 1969 K. CLARK ET AL 3,483,495

PULSE TRANSFORMER AND METHOD OF FABRICATION

Filed Jan. 15, 1968 2 Sheets-Sheet 1

KENDALL CLARK
FRANK L. DE TURRIS
RONALD G. KAPER
*INVENTORS*

BY

John F. Ohlandt Jr.
ATTORNEY

United States Patent Office 3,483,495

Patented Dec. 9, 1969

3,483,495

PULSE TRANSFORMER AND METHOD OF FABRICATION

Kendall Clark, Poughkeepsie, and Frank L. De Turris, Wappingers Falls, N.Y., and Ronald G. Kaper, Boulder, Colo., assignors to International Business Machines Corporation, Armonk, N.Y., a corporation of New York Filed Jan. 15, 1968, Ser. No. 697,954

Int. Cl. H01f *15/02*

U.S. Cl. 336—65 7 Claims

ABSTRACT OF THE DISCLOSURE

The windings and interconnecting leads for a pulse transformer or the like are produced by the die casting of metal. The die casting is so performed that the windings and interconnecting leads are produced unitarily, that is, in one operation. There can also be produced terminals as integral extensions of the interconnecting leads; and support tabs which serve to attach an encapsulated core unit to its carrier. The interconnecting leads are rigidly held by the carrier. A mechanized line for the above-described production is disclosed.

BACKGROUND, OBJECTS AND SUMMARY OF THE INVENTION

This invention relates to an improvement in the manufacture of ferro-magnetic devices and, more particularly, to the fabrication of extremely small annular bodies or magnetic components having suitably disposed windings and adapted for use in pulse transformers, memory elements, and the like.

The present invention is more particularly concerned with the fabrication of inductors and transformers comprising toroidal cores, usually composed of ferrite material, surrounded by windings. The invention is also concerned with a technique for so fabricating these devices that they are immediately ready for application, in the form of pulse transformers and the like, as components in electrical circuits. The technique includes encapsulating the cores, forming their essential windings and connecting leads so that the windings may be connected to terminals for circuit installations. Since pulse transformers and like magnetic components are often destined to be incorporated in integrated circuit arrangements, the windings must in these cases be connected to terminals whose function it is to fit properly with other integrated circuit components.

In order that the man skilled in the art may have some background for a thorough appreciation of the present invention, and in order to highlight the differences which characterize the present invention, reference may be made to U.S. Patent 3,319,207 which discloses a form of magnetic component which basically comprises a grooved toroidal ferrite body including a metal filling in the grooves so as to define a helical winding for the toroidal body. Other patents which may be referred to as providing additional background are U.S. Patents 2,965,865; 2,512,162 and 2,654,861.

The essential technique of U.S. Patent 3,319,207, cited above, has as its fundamental objective the provision of an improved magnetic component in which the winding or coil for the magnetic core does not have to be produced by any winding operations such as are encountered when ordinary wire is to be used to form the coil. Although the technique described in this patent gets away from the difficulty stemming from the requirements that the coil be laboriously wound, it does not provide the answers for developing a fully automated, high production approach to forming the magnetic core units. In other words, the described technique leaves unfulfilled the objective of achieving a significant reduction in the handling of the cores.

Accordingly, it is a fundamental object of the present invention to reduce significantly the handling operations heretofore required in the manufacture of annular magnetic components that are adapted for use in pulse transformers and like devices.

Another object is to form the required conductors that define the helical windings for magnetic cores, and at the same time to form the interconnecting leads from the windings disposed about the cores to the terminals required for eventual joinder with other components.

Another object is to form the aforesaid windings and the interconnecting leads for a magnetic core device and to support said device so that it can be produced in the required form by a mechanized series of operations.

A more specific object is to join the magnetic core device to a supporting carrier while at the same time forming the required windings and interconnecting leads.

Another object is to simultaneously form the windings and interconnecting leads for extremely small magnetic components having sizes on the order of 1/4 inch in diameter (outside).

Briefly stated, an important aspect of the present invention resides in a unique magnetic component construction technique according according to which the windings and interconnections are realized by unitarily die casting metal so as to form the helical winding or windings. There is formed simultaneously therewith the interconnection pattern for leads, as well as support tabs that serve to physically connect the annular magnetic core to a carrier plate.

The die casting technique for forming the windings and connections enables turning out extremely small magnetic elements on a production line basis. A typical magnetic core can be completely processed according to the technique of the present invention in a matter of a few minutes.

In accordance with more specific features of the present invention it is provided that the extension of the casting of the aforesaid intersections, i.e. the leads from the core itself to terminals, is in such a configuration that the metal which forms the leads is locked with the surrounding carrier frame, the carrier frame being perpendicular to the axis of the core and aligned with one of the plane surfaces of the core. This "integral lock" of the leads over the plastic carrier insures firmness in the retention of the leads and insures that they will line up satisfactorily with their receiving sockets in mating circuit cards or boards.

In accordance with another aspect, the present invention comprises a mechanized process or method for producing miniature magnetic core devices and particularly in the form of pulse transformers. In essence, the method comprises the following fundamental steps: Feeding of magnetic cores to the die casting station, the operation, as described above, of die casting the windings, and the further steps, at another sation, or stations, of a mechanized trimming and mechanized testing. Additional intermediate operations of etching, rinsing, and finally overcoating the entire assembly may also be included.

The foregoing and other objects, features and advantages of the invention will be apparent from the following more particular description of preferred embodiments of the invention, as illustrated in the accompanying drawings.

DESCRIPTION OF PREFERRED EMBODIMENTS

Figure 1:
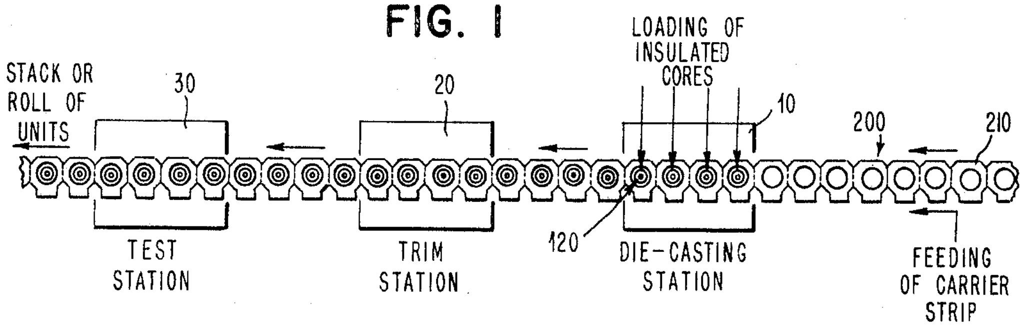
FIG. 1 is a flow diagram illustrating the steps of the basic technique of the present invention.

Referring now for the moment to FIG. 1, there is schematically illustrated the mechanized process, in accordance with the present invention, for producing pulse transformers and the like. It will be appreciated, looking to the right, that a carrier strip 200 is being fed into a die casting station 10. This carrier strip 200 comprises a string of interconnected plates 210, which can be separated when desired. The strip 200, which is made of Mylar plastic or the like, can be in the form of fairly short strip lengths or it can be in the form of a lengthy coil that can be readily unrolled. This carrier strip arrangement is a key factor in the mechanization of the processing of the core units: Thus, this carrier strip 200 can be easily conveyed through the various stations, such as, the further stations 20 and 30, these being a trim station and test station, respectively.

Because of the exigencies of the die casting operation at station 10, the step of trimming unwanted metal from the assemblage as it emerges from station 10 is necessary and this trimming is carried out at the station 20. Thereafter, at the station 30 the desired electrical and magnetic properties of the units are tested. Beyond this station, the finished articles, which are still interconnected by virtue of the interconnection of the plates on the carrier strip, are then rolled up; again, in a form much like the form of the carrier strip as it was initially fed to the die casting station 10.

For convenience of illustration, a simplified multiple die arrangement is shown at the station 10. That is to say, a four-cavity die is depicted. Normally, the magnetic cores, suitably surrounded by an insulative coating, would be fed in four at a time. In other words, four cores would be loaded, typically by using a vacuum load, into the station 10. Suitable indexing is provided so that the carrier strip 200 is in proper position, whereby the apertures provided in the plates 210 line up with the cores which are to be inserted therein.

Reference to FIGS. 2–6 will make abundantly clear the detailed application of the die casting operation to produce the magnetic components in accordance with the present invention. Referring specifically to FIGS. 2A, 2B, 2C and 2D, there is illustrated the progression from the beginning of the process, that is, from the point of feeding of the carrier strip to the die casting station, to the point where the article emerges with its die cast windings and other conductors. Each of the individual carrier plates 210 is provided with an aperture 210*a*. The fold line 211 is shown between adjacent plates 210. Along one side of each carrier plate 210 there are provided a number of perforations 210*b* for purposes to be described. A given core unit 120 is seen being moved down to approach the carrier plate 210. This core unit 120 comprises the annular magnetic core 100 and its adherent insulating covering 110. This insulating covering is necessary because the ferrite material that is generally used for the core is a conductor. Hence, it is necessary to insulate the core from the windings that are to be placed around it.

Figure 5:
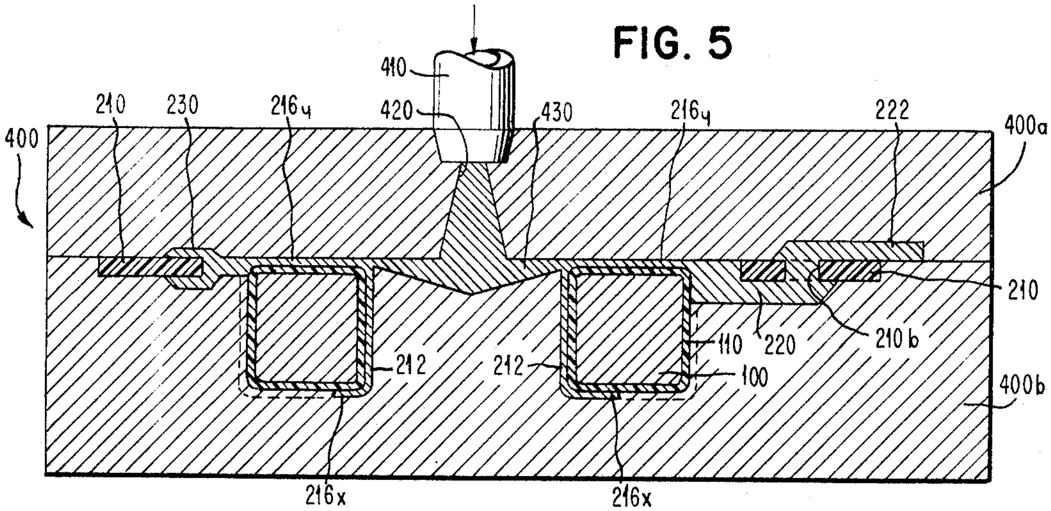
FIG. 5 is a cross-sectional view through the die casting apparatus for performing the die casting operation on the insulated core unit.
Figure 2A:
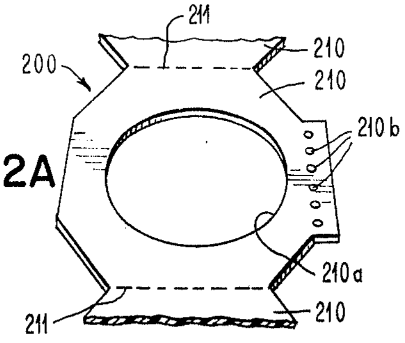
FIGS. 2A, 2B, 2C, and 2D illustrate the several steps in the fabrication of a pulse transformer or like device.
Figure 2B:
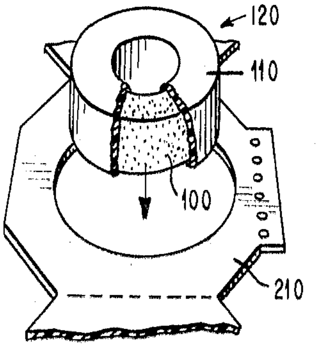
Figure 2C:
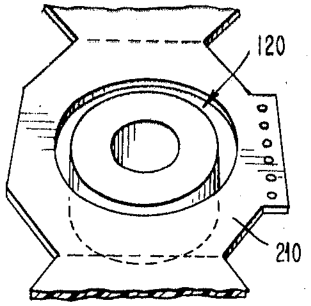

FIG. 2C illustrates the core unit 120 and its carrier plate 210, as these would be positioned relatively to each other within the die casting apparatus. This die casting apparatus is of generally conventional construction except for the die sections themselves which because of their complementary configuration, will serve to produce the required windings, interconnecting leads, terminals and support tabs. Referring to FIG. 5, it will be understood that a multiplicity of dies, like the die 400, are normally provided at the die casting station 10. For the particular construction of a pulse transformer that is to be produced, a series of grooves or slots are provided in the die 400 in order to establish the necessary channels or recesses for the flowing metal to form the required conductors.

Figure 2D:
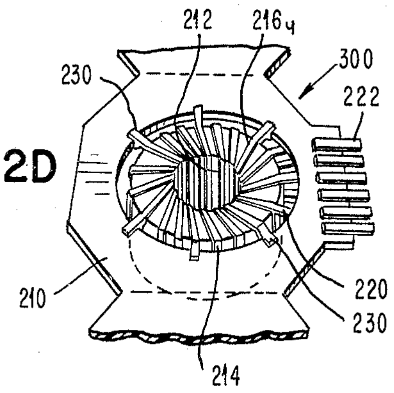
Figure 3:
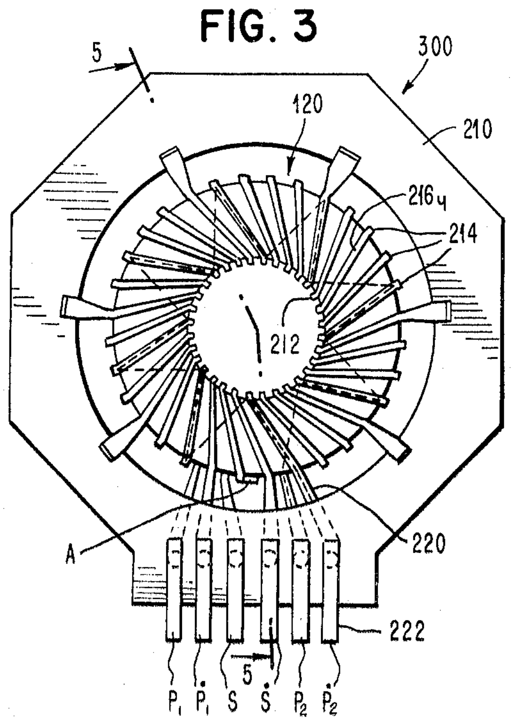
FIG. 3 is a bottom plan view of a finished magnetic device, i.e., a toroidal pulse transformer, constructed in accordance with the technique of the present invention.
Figure 4:
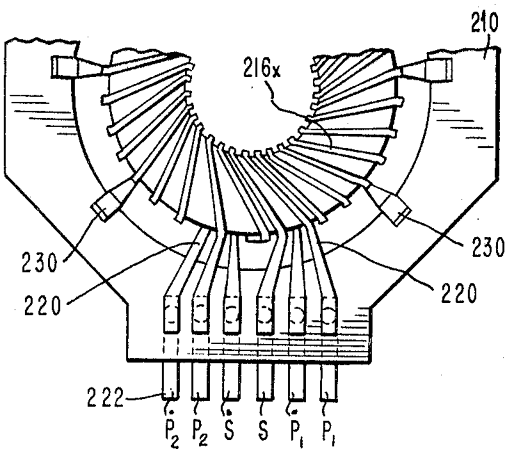
FIG. 4 is a top plan view, broken away, of the pulse transformer.

The windings for the core are seen in FIG. 2D, and also in FIGS. 3 and 4, as comprising a series of interconnected conductors which have been die cast into serially connected grooves. These are a plurality of axially-extending conductors 212, at the inner periphery of the core, and 214, at the outer periphery thereof. The skewed conductors 216*x* and 216*y* are serially interconnected with appropriately spaced ones of these axially-extending conductors 212 and 214. The conductors 216*x* are at the top face of the core and 216*y* at the bottom face.

Unitarily produced in the die casting operation are the interconnecting leads 220 which extends from the windings surrounding the core to the terminals. The terminals are seen as integral extensions of the interconnecting leads and are designated 222. The die parts 400*a* and 400*b* are provided with complementary surfaces to produce the leads 220 and 222, as will be understood.

It is a notable feature of the present invention that the die casting of the interconnecting leads is such that their extension into the terminals 222 is in a configuration which is locked about the carrier plate 210. In other words, as can be seen in FIG. 5 perforation 210*b* in the carrier plate allow for the flow of metal between the recesses normally provided in the lower mold half 400*b* up into the upper mold half 400*a* and in so doing, of course, define the integrally-extended terminals 222.

Also unitarily formed by the die casting step are the support tabs 230 which are spaced around the outer periphery of the core unit 120. The support tabs are, for example, six in number as shown in the figures, but any suitable number can be selected. These tabs extend from given ones of the winding conductors outwardly and are attached to the carrier plate 210 by means of the U-shaped configuration, seen in FIG. 5, about the inner edge.

Once a given carrier plate 210, and the core unit 120 to be attached to the plate, have been placed in the die 400 as shown in FIG. 5, metal is forced into the die by means of, for example, a conduit 410. The metal is forced under sufficient pressure so that the flowing metal is able to penetrate into all the spaces defined by the grooves and recesses provided therein. A gate or sprue 420 is provided in the upper die part 400*a* for communication with the conduit 410. It will be noted that, because of the illustrated arrangement a shallow cone 430 of metal is produced at the central area. This metal is, of course, eventually sheared away in the trimming operation. Conduit 410 is separable.

The die parts 400*a* and 400*b*, in the actual die casting operation, are usually heated to a temperature of approximately 440° F., depending on the metal used. A tin-silver alloy has been found to be the best composition for this kind of operation. The percentage of silver can be varied from about 5% upward to about 15%. Zinc may also be used.

The particular winding configuration for the pulse transformer 300, which is by way of example, is best appreciated by reference to FIGS. 3 and 4. This is a so-called quad filar winding configuration and involves the use of six terminals, although the number of these terminals can be varied. One of the windings, that is, the primary winding P can be traced out by reference to the dotted lines shown on FIG. 3. Bearing in mind that this is a bottom view of the finished pulse transformer, the complete circuit path for this particular winding can be traced beginning at the terminals marked $P_2$ (dotted). From this point, the path extends by way of the interconnecting lead 220 to the bottom face of the core unit 120 where the interconnecting lead 220 joins with a skewed conductor 216y. Thence, by way of the axially-extending conductor 212 to the top face of the core unit and then by way of the skewed conductor 216x and so on for successive conductors finally terminating by way of another interconnecting lead 220 to the terminal 222 designated $P_2$. It will be understood that there are actually four separate windings completely encircling the core. However, only six terminals are required because the secondary is made up of two separate windings. The center point for these can be seen in FIG. 3 and is designated by the symbol A. Therefore, only two terminals marked S and S (dotted) are required for the secondary of this pulse transformer.

Figure 6:
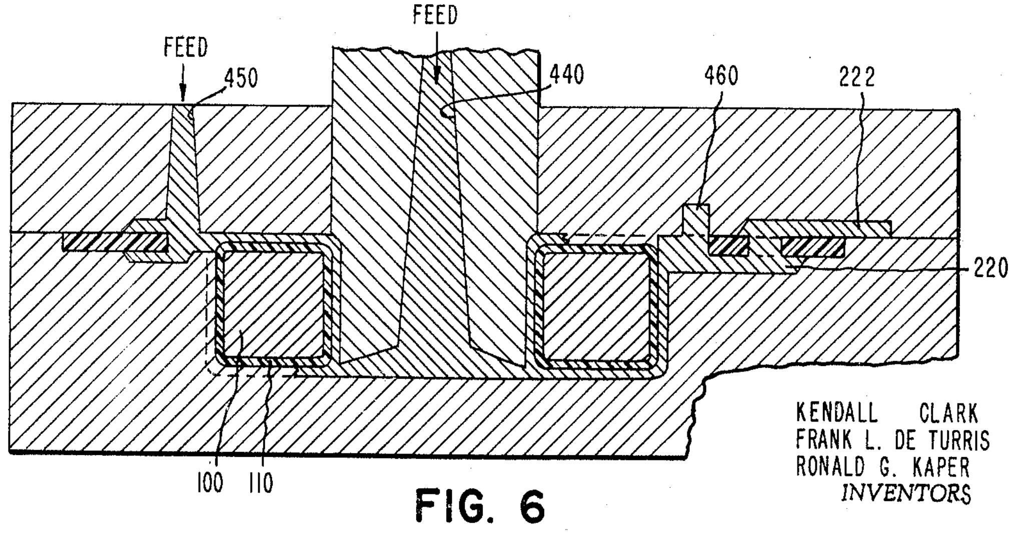
FIG. 6 is a modified version for the die casting apparatus.

FIG. 6 illustrates a modification to the die casting apparatus. The same essential die parts 400a and 400b are provided. However, a slightly different arrangement for feeding metal to the core unit is utilized. The arrangement of FIG. 6 reduced the length of the metal run by providing two separate feeds: a central feed in the form of a feed sprue 440 which feeds in to the bottom of the cavity and also a circular ring runner 450 which is fed by a separate feed means 460.

The finished magnetic component in the form of the pulse transformer 300 is now substantially completed. However, it is necessary to trim the unwanted metal resulting from the die casting operation and this is done at the station 20 on a continuous basis. That is to say, the carrier strip 200 is constantly being fed to this trim station and typically the units are handled four at a time. Thereafter, as already noted, groups of these units are tested on a mechanized basis for determining whether they meet the specifications regarding their electrical and magnetic properties.

While there have been shown and described and pointed out the fundamental novel features of the invention as applied to the preferred embodiments, it will be understood that various omissions and substitutions and changed in the form and details of the device illustrated and in its operation may be made by those skilled in the art without departing from the spirit of the invention. It is the intention, therefore, to be limited only as indicated by the scope of the following claims.

What is claimed is:

1. A process of fabricating annular magnetic core devices comprising the steps of:
 forming an elongated carrier strip comprising a plurality of interconnected carrier plates, each of said plates having a large central aperture adapted to receive a magnetic core and a plurality of perforations provided near one edge of each of said plates;
 feeding said carrier strip as a continuous strip through a plurality of operating stations, the first station operable for die casting windings around said cores and interconnecting leads extending from said cores;
 disposing groups of cores at said first station so that each of said cores has a plane radial face substantially aligned with an axis of its corresponding carrier plate;
 casting windings around said cores and, concurrently therewith, unitarily forming support tabs extending to said carrier plate and interconnecting leads extending through said perforations provided in said carrier plate so that said interconnecting leads are firmly locked into place therein.

2. A process as defined in claim 1, in which the step of unitarily forming windings is carried out by die casting of metal conductors to define said windings.

3. A process as defined in claim 2, in which the die cast metal is a tin-silver alloy, comprising 5–15% silver, and in which the temperature for die casting is approximately 440° F.

4. A magnetic component comprising:
 an insulated, annular magnetic core, an individual carrier for said core in the form of a thin plate having a large central aperture within which said core is disposed;
 at least one helical winding extending around said annular core and, as unitary extensions thereof, interconnecting leads connected to said windings and extending along said carrier plate;
 support tabs unitary with said winding and extending, at spaced locations, from the outer periphery of said core, and attached, at corresponding spaced locations, to be inner periphery defined by said central aperture of said plate.

5. A component as defined in claim 4, in which said plate has a plurality of perforations near one outer edge thereof; and said interconnecting leads extend outwardly from said windings along one face of said plate, thence through said perforations to the other face of said place, and thereupon extend outwardly from said edge of said plate.

6. A pulse transformer comprising:
 an insulated annular magnetic core, an individual carrier for said core in the form of a thin plate having a central aperture within which said core is disposed;
 a plurality of helical windings extending around said annular core and, as unitary extension thereof, interconnecting leads connected to said windings and extending along said carrier plate;
 support tabs unitary with said windings and extending at spaced locations, from the outer periphery of said core, and attached, at corresponding spaced locations, to the inner periphery defined by said central aperture of said plate.

7. A pulse transformer as defined in claim 6, in which said plate has a plurality of perforations near one outer edge thereof; and said interconnecting leads extend outwardly from said windings along one face of said plate, thence through said perforations to the other face of said place, and thereupon extend outwardly from said edge of said plate.

References Cited

UNITED STATES PATENTS

| | | | |
|---|---|---|---|
| 2,899,631 | 8/1959 | Cushman -------- | 336—96 XR |
| 3,027,526 | 3/1962 | Patka et al. ------ | 336—68 XR |
| 3,205,408 | 9/1965 | Boehm et al. | |
| 3,287,795 | 11/1966 | Chambers et al. | |

LEWIS H. MYERS, Primary Examiner

T. J. KOZMA, Assistant Examiner

U.S. Cl. X.R.

29—606, 200, 198; 336—192, 229